United States Patent

Mottino et al.

[11] Patent Number: 5,286,078
[45] Date of Patent: Feb. 15, 1994

[54] ARMREST FOR A VEHICLE

[75] Inventors: Claudio Mottino; Nevio Di Giusto, both of Turin, Italy

[73] Assignee: Fiat Auto S.p.A., Turin, Italy

[21] Appl. No.: 960,550

[22] Filed: Oct. 13, 1992

[30] Foreign Application Priority Data

Oct. 15, 1991 [IT] Italy .................. TO91U 000254

[51] Int. Cl.[5] .................................. B60N 3/00
[52] U.S. Cl. .................. 296/153; 297/411.21; 200/5 R; 200/52 R
[58] Field of Search .............. 296/153; 297/411-413, 297/417; 200/5 R, 52 R; 307/10.1; 312/30

[56] References Cited

U.S. PATENT DOCUMENTS

| | | | |
|---|---|---|---|
| 4,180,713 | 10/1979 | Gonzales | 200/52 R |
| 4,473,724 | 9/1984 | Suzuki | 200/6 R X |
| 5,158,353 | 10/1992 | Kimisawa | 296/153 X |

FOREIGN PATENT DOCUMENTS

| | | | |
|---|---|---|---|
| 0084107 | 7/1983 | European Pat. Off. | |
| 0114959 | 8/1984 | European Pat. Off. | 200/52 R |
| 3445891 | 6/1986 | Fed. Rep. of Germany | 200/5 R |
| 3719105 | 12/1988 | Fed. Rep. of Germany | |
| 2391681 | 12/1978 | France | |
| 2391871 | 12/1978 | France | |
| 0080935 | 5/1982 | Japan | 296/153 |
| 9009127 | 8/1990 | PCT Int'l Appl. | |

Primary Examiner—Dennis H. Pedder
Attorney, Agent, or Firm—Ladas & Parry

[57] ABSTRACT

An armrest comprising a supporting portion bounded above by a surface supporting the forearm of a user, and a terminal portion constructed in such a way as to house a first and a second switch panel located on opposite sides of the said terminal portion for the control of at least one corresponding service in the vehicle; the terminal portion is hinged onto the supporting portion to be rotated with respect to the supporting portion between a first working position in which the terminal portion extends longitudinally beyond the said supporting portion and in which the first switch panel is located on the same side as the supporting surface, and a second working position in which the terminal portion overlaps the supporting portion and the first and the second switch panels are located in contact with the supporting surface and in a position facing away from the said part of the supporting surface respectively.

7 Claims, 1 Drawing Sheet

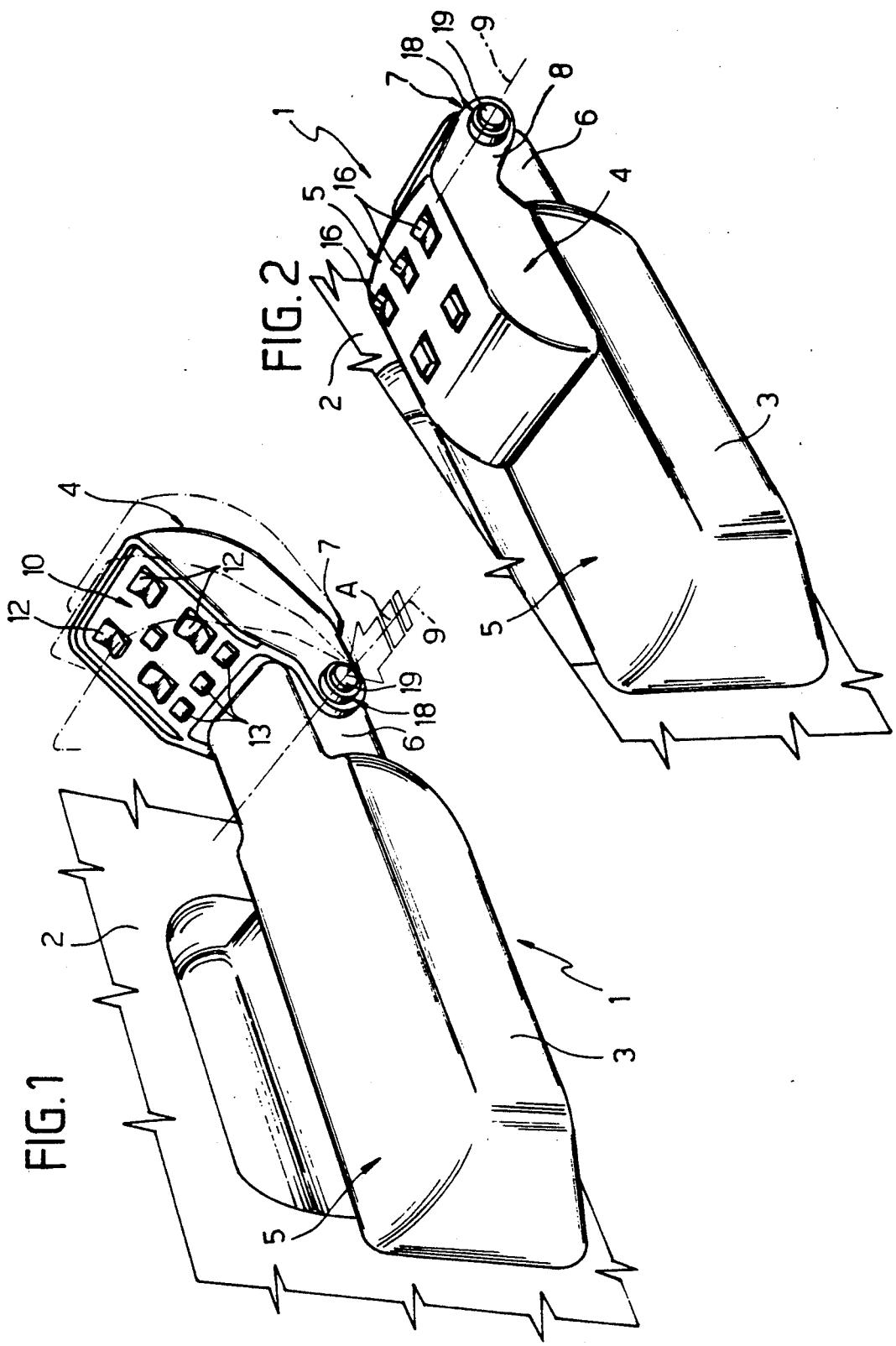

ARMREST FOR A VEHICLE

BACKGROUND OF THE INVENTION:

This innovation relates to an armrest for a vehicle.

In particular this innovation relates to an armrest which can be stably attached to an internal panel of a motor vehicle door.

In most applications the armrest comprises a posterior portion which supports the forearm of a user, and an anterior terminal portion which is integral with the posterior supporting position and is shaped in such a way as to house a switch panel.

This switch panel generally comprises one or more push buttons able to control the operation of corresponding components in the vehicle which are operated by electrical devices. In particular the aforesaid pushbuttons generally control the operation of those components of the motor vehicle which are most frequently used by the user, such as for example the door windows, while components which are adjusted or displaced occasionally, such as for example the seats of the motor vehicle, are moved by of switches which in most applications are located to the side of the seat in question.

Generally speaking, these latter switches are difficult to operate in that they are difficult to reach and are placed in a position which is not directly visible to the user, especially when driving the motor vehicle.

SUMMARY OF THE INVENTION

The object of this innovation is to provide an armrest which overcomes the aforementioned disadvantages and at the same time is simple and economical to construct.

In accordance with this innovation an armrest has been constructed for a vehicle comprising a portion supporting the forearm of a user bounded at the top by a supporting surface, and a terminal portion shaped in such a way as to house a first control switch panel for at least one service in the vehicle, characterised in that the said terminal portion is hinged to the said supporting portion to rotate with respect to the supporting portion between a first extreme working position in which the said terminal portion is located at the end of the said supporting portion and the said first switch panel is located on the same side as the supporting surface, and a second extreme working position in which the said terminal portion at least partly overlaps the said supporting portion and the said first switch panel is located in a position facing the said supporting surface, the said terminal portion being also shaped so as to house a second switch panel which is substantially located on the opposite side of the said terminal portion with respect to the first switch panel.

BRIEF DESCRIPTION OF THE DRAWINGS

The innovation will now be described with reference to the appended drawings, which illustrate a non-restrictive embodiment thereof, in which:

FIG. 1 is a perspective view of a preferred embodiment of an armrest according to the innovation, and FIG. 2 illustrates the armrest in FIG. 1 in a different working configuration, in perspective.

DETAILED DESCRIPTION OF THE INVENTION

In the appended FIGS. 1 indicates an armrest which can be attached to a panel 2 of the door of a vehicle (not illustrated), in particular to a panel of a motor vehicle door.

Arm 1 comprises a posterior portion 3 supporting a forearm (not illustrated) of a user (not illustrated), and an anterior terminal portion 4 hinged to the said supporting portion 3. The latter is stably attached to panel 2, and is bounded at the top by a surface 5 which supports the forearm of the user and comprises a front appendage 6 bearing terminal hinged portion 4, which includes a fork 7, the arms 8 of which extend laterally on opposing sides of said appendage 6. These arms 8 are hinged to appendage 6 to allow terminal portion 4 to rotate with respect to supporting portion 3 about a horizontal axis 9 at right angles to a longitudinal axis of armrest 1 between a first extreme working position illustrated in FIG. 1 in which terminal portion 4 extends longitudinally outward from supporting portion 3, and a second extreme working position illustrated in FIG. 2 in which portion 4 is located above supporting portion 3 and is in contact with surface 5 said portion 3.

As illustrated in FIG. 1, terminal portion 4 is formed in such a way as to house a first switch panel 10, which comprises a plurality of rocker switches 12, and a corresponding plurality of indicator lights 13. Each of switches 12 is capable of controlling a corresponding electrically driven component (not illustrated) of the motor vehicle (not illustrated), in particular these switches 12 are capable of controlling those components of the motor vehicle which under normal conditions of use are moved most frequently, such as e.g. the door windows (not illustrated).

When terminal portion 4 is placed in the first working position, switch panel 10 forms an extension of supporting surface 5, and in particular forms an obtuse angle with said supporting surface 5, while when terminal portion 4 is placed in the second extreme working position switch panel 10 is located in a position facing supporting surface 5 and substantially in contact therewith.

As illustrated in FIG. 2, terminal portion 4 is also shaped in such a way as to house a second switch panel 15 which is located substantially on the opposite side of terminal portion 4 with respect to first switch panel 10, and when same terminal portion 4 is placed in the second extreme working position it extends in the same direction as supporting surface 5 and forms a substantially planar angle therewith (i.e., is substantially parallel thereto). This switch panel 15 also comprises a plurality of rocker switches 16, each of which is capable of controlling a corresponding electrically operated component (not illustrated) of the motor vehicle (not illustrated). In particular these switches 16 are capable of controlling those components of the motor vehicle (not illustrated) which under normal conditions of use are moved less frequently than the components controlled by the switches 12 of first switch panel 10. For example switches 16 are generally capable of controlling the adjustment of the front seats (not illustrated) of the vehicle, and/or the rear view mirrors (not illustrated) of the motor vehicle (not illustrated).

Again with reference to the appended figures, between supporting portion 3 and terminal 4 there is placed a known angular locking device 18 which can be operated by an operator and is capable of adopting a plurality of preferred angular positions (indicated by dotted and dashed lines in FIG. 1) of 1 portion 4 with respect to supporting portion 3 between the said first and second extreme working positions.

Device 18 comprises a control switch 19, operation of which by the user in the direction of arrow A (FIG. 1) releases portions 3 and 4 from their locked angular relationship.

In use, assuming for example that terminal portion 4 is located in the first working position and therefore is in the condition in which switch panel 10 may be used, action on switch 19 makes it possible to release terminal portion 4 from its linked angular relationship to supporting portion 3 and consequently to rotate terminal portion 4 around axis 9 by substantially 180° to bring it into the second working position and therefore make second switch panel 15 accessible to the user. Alternatively, again starting from the condition in which terminal portion 4 is located in the first working position, it is possible by operating switch 19 to rotate terminal portion 4 about axis 9 in such a way as to vary the angular position of first switch panel 10 with respect to supporting surface 5 and adjust switch panel 10 to the user's requirements.

From what has been described it is clear that armrest I described above has the advantage that first of all first switch panel 10 controlling the components of the motor vehicle which are used with greater frequency can be adjusted to the users requirements, but also makes it possible to easily control those components of the said motor vehicle which are used less frequently than the former. In fact the structural characteristics of armrest 1 substantially make it possible for the switch panel to be changed over simply and immediately, and, in particular, this may be performed by the user even while driving the vehicle.

It is also clear that modifications and variants which do not go beyond the scope of the protection of this innovation may be made to armrest 1. In particular the manner in which terminal portion 4 is connected to supporting portion 6 may be varied, and the position of axis 9 about which terminal portion 4 is rotated with respect to supporting portion 3 may also be varied.

Finally, armrest 1 may not be of a type which is suitable for connection to the inner panel 2 of a door, but may be a armrest adjacent to a user's seat and/or placed between two front or rear seats of the vehicle.

We claim:

1. An armrest (1) for a vehicle comprising a supporting portion (3) bounded at the top by a substantially planar supporting surface (5) extending from a rear edge to a front edge of the armrest for receiving the forearm of a user and a terminal portion (4) housing a first switch panel (1) and a second switch panel (15) respectively on the opposite sides of the terminal portion (4), the terminal portion (4) being hinged to the supporting portion (3) to rotate between a first and a second extreme working position, wherein:
   (i) in the first extreme working position, a rear edge of the first switch panel (10) lies above and beyond the front edge of the armrest on the same side as the supporting surface (5) and forms an extension of the supporting surface (5);
   (ii) in the second extreme working position, the terminal portion (4) at least partly overlaps the supporting portion (3) so that the first switch panel (10) faces the supporting surface (5), the terminal position being substantially in contact therewith, and the second switch panel (15) extends in the same direction as the supporting surface (5) substantially parallel therewith; and
   (iii) the first switch panel (10) is for controlling first components of the vehicle that are operated more frequently, while the second switch panel (15) is for controlling second components of the vehicle that are operated less frequently.

2. The armrest according to claim 1, wherein the terminal portion (4) rotates around an axis (9) which is substantially horizontal and at right angles to a longitudinal axis of the armrest.

3. The armrest according to claim 1, wherein, when the terminal portion (4) is in the first extreme working position, the first switch panel (10) forms an obtuse angle with the said supporting surface (5).

4. The armrest according to claim 1, wherein, between the supporting portion (3) and the terminal portion (4), there is an angular locking device (18) for operation by the user to lock the rotation of the terminal portion (4) at an angle with respect to the supporting portion (3) between the first and second extreme working positions.

5. The armrest according to claim 4, wherein the locking device (18) including an operating switch (19).

6. The armrest according to claim 1, wherein the first switch panel (10) comprises a plurality of rocker switches (12) and the second switch panel (15) comprises a plurality of rocker switches (16).

7. The armrest according to claim 1, wherein the supporting portion (3) is stably attached to an inner panel (2) of a vehicle door.

* * * * *